United States Patent
Christiansen et al.

(10) Patent No.: US 6,214,230 B1
(45) Date of Patent: *Apr. 10, 2001

(54) COMPOSITION AND METHOD FOR REMOVING SUSPENDED SOLIDS FROM WASTEWATER

(75) Inventors: John A. Christiansen; Erik Rumbaugh, both of Baton Rouge, LA (US)

(73) Assignee: International Biochemicals Group, Ltd., The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/447,387

(22) Filed: Nov. 23, 1999

Related U.S. Application Data

(63) Continuation of application No. 08/971,348, filed on Nov. 17, 1997, now Pat. No. 6,039,875.

(51) Int. Cl.$^7$ ................... C02F 1/56; C02F 3/12
(52) U.S. Cl. ............... 210/606; 210/611; 210/620; 210/730
(58) Field of Search ................ 210/606, 611, 210/609, 620, 625, 631, 702, 730, 738

(56) References Cited

U.S. PATENT DOCUMENTS

| | | |
|---|---|---|
| 3,485,752 | 12/1969 | Eck et al. . |
| 3,537,990 | 11/1970 | Eck et al. . |
| 3,763,039 | 10/1973 | Wilson . |
| 3,839,202 | 10/1974 | Roy . |
| 3,958,364 | 5/1976 | Schenk et al. . |
| 4,018,650 | 4/1977 | Busta et al. . |
| 4,159,944 | 7/1979 | Erickson et al. . |
| 4,363,733 | 12/1982 | Meiller . |
| 4,530,763 | 7/1985 | Clyde et al. . |
| 4,696,750 | 9/1987 | Donald . |
| 4,720,346 | 1/1988 | Flesher et al. . |
| 4,880,740 | 11/1989 | Hoffmann et al. . |
| 4,894,161 | * 1/1990 | Shilo et al. ................ 210/730 |

(List continued on next page.)

FOREIGN PATENT DOCUMENTS

1573429 * 8/1980 (GB) .

OTHER PUBLICATIONS

Jia, X.S.; Furamai, H.; Fang, H. H. P., abstract of "Yields of Biomass and Extracellular Polymers in Four Anaerobic Sludges", *Environmental Technology* vol. 17, No. 3, pp. 283–291 (1996), pub. in Hong Kong.*

(List continued on next page.)

*Primary Examiner*—Christopher Upton
(74) *Attorney, Agent, or Firm*—Roy, Kiesel & Tucker

(57) ABSTRACT

The invention comprises the use of bacterially generated polymers as coagulants and flocculents for the removal of suspended solids from wastewater. Polymer producing bacteria such as *Bacillus polymyxa* NRRL 21881 are added to wastewater treatment systems. The bacteria will reproduce in the system, substantially increasing the number of coagulants over the amount of original bacteria introduced. Throughout their life cycles, the bacteria will biologically treat $BOD_5$ in the system. When the $BOD_5$ levels are sufficiently low, the bacteria will produce polymers to increase their ability to capture organic matter. The polymers will capture the suspended particles in the water, creating strands of polymer connected particles. As the strands come into contact with one another, the strands will become entwined, creating flocs. These flocs will combine and will absorb the suspended particles which they encounter. If the flow of the system is reduced to a non-turbulent or laminar rate, the flocs will agglomerate to densities sufficient to cause the flocs to fall out of suspension. The result is a reduction in effluent TSS without an offsetting increase in $BOD_5$.

2 Claims, 7 Drawing Sheets

U.S. PATENT DOCUMENTS

| | | | |
|---|---|---|---|
| 4,954,259 | * | 9/1990 | Elmaleh et al. ............... 210/730 |
| 4,966,713 | * | 10/1990 | Keys et al. ............... 210/730 |
| 5,093,009 | | 3/1992 | Candau . |
| 5,128,040 | * | 7/1992 | Molof et al. ............... 210/625 |
| 5,227,068 | | 7/1993 | Runyon . |
| 5,284,587 | | 2/1994 | Wong et al. . |
| 5,314,619 | | 5/1994 | Runyon . |
| 5,326,854 | | 7/1994 | Stahl et al. . |
| 5,637,229 | | 6/1997 | Rieber . |

OTHER PUBLICATIONS

Schmidt, J.E.; Ahring, B.K, abstract of "Extracellular Polymers in Granular Sludge from Different Upflow Anaerobic Sludge Blanket (UASB) Reactors", *Applied Microbiology and Biotechnology* vol. 42, No. 2–3, pp. 457–462 (1994), pub. in Lyngby, Denmark.*

Hsieh, K. M.; Murgel, G. A.; Lion, L.W.; Shuler, M. L., abstract of "Interactions of Microbial Biofils with Toxic Trace Metals. I. Observation and Modeling of Cell Growth, Attachment and Production of Extacellular Polymer", Abbreviated Journal Title—*Biotechnology and Bioengineering* vol. 44, No. 2 (1994) pp. 219–231, pub. in Ithaca, New York.*

Morgan, J. W.; Evison, L. M.; Forster, C. F., abstract of "An Examination into the Composition of Extracellular Polymers Extracted from Anaerobic Sludges", Abbreviated Journal Title—*Process Safety and Environmental Protection* vol. 59, No. B4 (Nov. 1991) pp. 231–236, pub. in Birmingham, United Kingdom.*

Anonymous Author, abstract of "Aspects of Industrial Research in Aromatics and Polymers", Abbreviated Journal Title—*Erdoel Und Kohle, Erdas, Petrochemie (Leinfelden)* vol. 40, No. 9 (1987) pp.*

Abstract of EP Application No. 87116928, filed Nov. 17, 1987, published in EP, on Jul. 6, 1988, Classes C02F00310; C02F00306.

Abstract of EP Application No. 82301851, filed Apr. 7, 1982, published in EP, on Oct. 13, 1982, Classes C02F01114; C02F01112.

Abstract of EP Application No. 91830258, filed Jun. 11, 1991, published in EP, on Apr. 2, 1997, Classes C12N01114; C02F01102.

Abstract of EP Application No. 93911010, filed May 4, 1993, published in EP, on Nov. 6, 1996, Classes C02F00310; C2F00312; C02F00306.

Abstract of EP Application No. 92921108, filed Oct. 13, 1992, published in EP, on Aug. 21, 1996, Classes C02F00172; C02F00146; C02F00170; C02F01100.

Abstract of EP Application No. 90907565, filed Apr. 27, 1990, published in EP, on Jun. 28, 1995, Classes C12Q00104; C12Q00134.

Abstract of EP Application No. 88904204, filed May 6, 1988, published in EP, on May 10, 1995, Classes C02F00312; C02f00310.

Abstract of EP Application No. 91121089, filed Dec. 9, 1991, published in EP, on Jun. 8, 1994, Classes B01J02118; C01B03108; C01B03108.

Abstract of EP Application No. 89102285, filed Feb. 10, 1989, published in EP, on Oct. 16, 1991, Classes C02F00152; C01F201146.

Abstract of EP Application No. 88304413, filed May 16, 1988, published in EP, on Aug. 21, 1991, Classes B01J02034; B03D00306; C02F01114.

Abstract of EP Application No. 425895, filed Apr. 21, 1995, published in EP, on unknown date, Class 6C02f00312.

Abstract of EP Application 174367, filed Dec. 28, 1993, published in EP, on unknown date, Class 6B01J03736; C12N01100; C12N01102; C12N01108.

Abstract of EP Application 993714, filed Dec. 18, 1992, published in EP, on unknown date, Class 5C02F00320.

Abstract of EP Application 949962, filed on Sep. 24, 1992, published in EP, on unknown date, Class 5C02F00312.

Abstract of EP Application 811539, filed on Dec. 20, 1991, published in EP, on unknown date, Classes 5C02F00300; C02F00302; C12N01100; C12N01110.

Nalco Chemical Company: *The NALCO Water Handbook* (Frank N. Kemmer ed., McGraw–Hill, Inc., New York 2d ed. 1988), 4.1–4.29, 5.1–5.17, 372, pub. Unknown.

Kepp, H., abstract of "The Influence of Polymers on the Anaerobic Digestion and the Dewaterability of Digested Sludge", Abbreviated Journal Title—*Das Gas—und Wasserfach. Ausgabe Wasser, Abswasser*, vol. 126, No. 2 (1985) pp. 76–80, pub. Unknown.

Rudd, T; Sterritt, R. M.; Lester, J. N., abstract of "Extraction of extracellular polymer from activated sludge", Abbreviated Journal Title—Biotechnology Letters, No. 5 (1983) pp. 327–332, pub. Unknown.

Reuter, M., abstract of "Application of organic polymer flocculents in the treatment of wastewater of the metalworking industry", Abbreviated Journal Title—Umwelt, No. 1 (1981) pp. 27–28, 30, 32–34, 36, pub. Unknown.

Kim, Y. H.; Simmon, H. W., abstract of "Improved sludge dewatering performance through in–line polymer mixing", Monograph Title—The environmental technology expo: proceedings of the 1992 technical program, (1992) pp. 145–150, pub. in Bradley, Illinois.

Miya, A.; Yasui, T.; Mishima, K., abstract of "Characterization of extracellular polymer in aerobic upflow sludge blanket (AUSB) process", Abbreviated Journal Title—Suishitsu Odaku Kenkyu, vol. 14, No. 10 (1991–10–10) pp. 665–673, pub. in Japan.

Ringqvist, L.; Bergner, K.; Olsson, Tommy; Bystroem, P., abstract of "Wastewater from dewatering of peat., Influence of wastewater from mechanical dewatering of peat on nymphs of two species of stream invertebrates", Statens Energiverk, pub. in Sweden.

Okazaki, Masaki; Hamada, Tosihiro; Fujii, Hiroaki; Mizobe, Akio; Matsuzawa, Shuji, abstract of "Development of poly-(vinyl alcohol) hydrogel for wastewater cleaning," Journal of Applied Polymer Science, vol. 58, n. 12, (Dec. 19, 1995), P2235–2241, pub. in Japan.

Al–Kassim, Loola; Taylor, Keith E.; Nicell, James A.; Bewtra, Jatinder K.; Biswas, Nihar; abstract "Enzymatic removal of selected aromatic contaminants from wastewater by a fungal peroxidase from Coprinus machrohizus in batch reactors", Journal of Chemical Technology and Biotechnogy, v 61, n 2, (1994), pp. 179–182, pub. in Canada.

Englande, A. G. Jr.; Eckenfelder, Jr., W. W.; abstract "Proceedings of the IAWPRC 2nd International Conference on Waste Management in Chemical and Petrochemical Industries—Toxics Management", Water Science and Technology, v. 25, n. 3, (1992), pub. in USA.

Abstract of EP Application No. 92108302, filed May 16, 1992, published in EP, on Dec. 2, 1992, Classes B01D07102; B01D07104; B01d06902.

8.3–8.23, 9.1–9.59, 17.1–17.13, 23.1–23.22, 30.1–30.32, 40.1–40.18.

Jenkins, David, Richard, Michael G., and Daigger, Glen T.: *Manual on the Causes and Control of Activated Sludge Bulking and Foaming* (Lewis Publishers, Michigan, 2d ed. 1993).

Rose, J.H.: Physiology of Cell Aggregation: Flocculation by Saccharomyces cerevisiae As a Model System. *Microbial Adhesion and Aggregation*, ed. K.C. Marshall, pp. 323–335. Dahlem Konferenzen 1984. Berlin, Heidelberg, New York, Tokyo: Springer Verlag.

O'Neill, Malcolm A.; Selvendran, Robert R.; Morris, Victor J.; Eagles, John: Structure of the Extracellular Polysaccharide Produced by the Bacterium *alcaligenes* (ATCC 31555) Species. *Research*, pp. 295–313. Elsevier Science Publishers, B.V. 1986. Amsterdam.

Friedman, Barry A.; Dugan, Patrick R.; Pfister, Robert M.; Remsen, Charles C.: Structure of Exocellular Polymers and Their Relationship to Bacterial Flocculation. *Journal of Bacteriology*, vol. 98, No. 3, pp. 1328–1334, Jun. 1969. American Society for Microbiology. USA.

Horan, N.J.; Eccles, C.R.: Purification and Characterization of Extracellular Polysaccharide from Activated Sludges. *Wat. Res.* vol. 20, No. 11, pp. 1427–1432, 1986. Pergamon Journals Ltd. Great Britain.

Dagley, S.; Dawes, E.A.: Factors Influencing the Polysaccharide Content of *Escherichia coli*. vol. 45, pp. 331–337, Feb. 28, 1949.

Klimek, J.; Ollis, D.F.: Extracellular Microbial Polysaccharides: Kinetics of *pseudomonas* sp., *Azotobacter vinelandii*, and *Aureobasidium pullulans* Batch Fermentations. *Biotechnology and Bioengineering*. vol. XXII. pp. 2321–2342, John Wiley & Sons, Inc., 1980.

McKinney, Ross E.; Horwood, Murray P.: Fundamental Approach to the Activated Sludge Process. *Sewage and Industrial Wastes*. vol. 24, No. 2., pp. 117–123. Feb., 1952.

Duguid, J.P; Wilkinson, J.F. The Influence of Cultural Conditions on Polysaccharide Production by Aerobacter aerogenes. *Journal of General Microbiology*, vol. 9, No. 2, pp. 174–189.

Goodwin, J.A.S.; Forster, C.F.: A Further Examination into the Composition of Activated Sludge Surfaces in Relation to Their Settlement Characteristics. *Water REs.*, vol. 19, No. 4, pp. 527–533. Pergamon Press Ltd., Great Britain. 1985.

Busch, Paul I.; Stumm, Werner: Chemical Interactions in the Aggregation of Bacteria; Bioflocculation in Waste Treatment. vol. 2, No. 1, pp. 49–53. Jan. 1968.

Calleja, G.B.; Atkinson, B.; Garrod, D.R.; Hirsch, P.; Jenkins, D.; Johnson, B.F.; Reichenbach, H.; Rose, A.H.; Schink, B.; Vincent, B.; Wilderer, P.A.: Aggregation Group Report. *Microbial Adhesion and Aggregation*. ed, K.C. Marshall, pp. 303–321. Dahlem Konferenzen 1984. Berlin, Heidelberg, New York, Tokyo: Springer–Verlag.

Sutherland, I.W.: Polysaccharides in the adhesion of marine and freshwater bacteria. pp. 329–338.

Gaudy, Elizabeth; Wolfe, R.S.: Composition of an Extracellular Polysaccharide Produced by *Sphaerotilus natans. Appl. Microbiol.* 10:200–205. 1962.

Cadmus, M.C.; Gasdorf, Helen; Lagoda, A.A.; Anderson, R.F.; Jackson, R.W.: New Bacterial Polysaccharide from *Arthrobacter. Appl. Microbiol.* 11:488–492. 1963.

Sieburth, John McN.: Inhibition and Agglutination of Arthrobacters by Pseudomonads. *Journal of Bacteriology*, Jun. 1967, vol. 93, No. 6, pp. 1911–1916.

Romano, Antonio H.; Peloquin, Joyce P.: Composition of the Sheath of *Sphaerotilus natans. Journal of Bacteriology*, 86:252–258. 1963.

Unz, Richard F.; Farrah, Samuel R.: Expolymer Production and Flocculation by Zoogloea MP6. *Applied and Environmental Microbiology*, vol. 31, No. 4, pp. 623–626, Apr. 1976,.

Atkinson, B.: Consequences of Aggregation. *Microbial Adhesion and Aggregation*, ed. K.C. Marshal, pp. 351–371. Dahlem Konferenzen 1984. Berlin, Heidelberg, New York, Tokyo, Springer–Verlag.

Zobell, Claude E.: The Effect of Solid Surfaces Upon Bacterial Activity. Scripps Institution of Oceanography, New Series No. 204. pp. 39–56.

Mian, F.A.; Jarman, T.R.; Richelato, R.C.: Biosynthesis of Exopolysaccharide by *Pseudomonas aeruginosa. Journal of Bacteriology*, vol. 134, pp. 418–422. May 1978.

Orskov, Ida; Orskov, Frits; Jann, Barbara; Jann, Klaus: Acidic Polysaccharide Anntigens of a New Type from *E. coli* Capsules. *Nature*. vol. 200, No. 4902, pp. 144–146. Oct. 12, 1963.

Meadows, P.S.; Anderson, J.G.: Microbiology. *Nature*. vol. 212, No. 5055, pp. 1059–1060. Dec. 3, 1966.

Kang, Kenneth S.; Veeder, George T.; Mirrasoul, Peter J.; Kaneko, Tatsuo; Cottrell, W.: Agar–Like Polysaccharide Produced by a *pseudomonas* Species: Production and Basic Properties. *Applied and Environmental Microbiology*, vol. 43, No. 5, pp. 1086–1091. May 1982.

Harris, Robert H.; Mitchell, Ralph: The Role of Polymers in Microbiol Aggregation. pp. 27–50.

Wilkinson, J.F.: The Extracellular Polysaccharides of Bacteria. *Bacterial. Review.* pp. 46–73. 1958.

Wardell, J.N.; Brown, C.M.; Ellwood, D.C.: A Continuous Culture Study of the Attachment of Bacteria to Surfaces. *Microbial Adhesion to Surfaces*. ed, Berkley, R.C.W.; Lynch, J.M.; Melling, J.; Rutter, P.R.; Vincent, B. pp. 221–230. Ellis Horwood 1980. England.

Friedman, Barry A.; Dugan, Patrick R.; Pfister, Robert M; Remsen, Charles C.: Fine Structure and Composition of the Zoogloeal Matrix Surrounding *Zoogloea ramigera. Journal of Bacteriology*. vol. 96, No. 6, pp. 2144–2153. Dec. 1968.

Pavoni, et al.: Exocellular Polymers. *Journal WPCF*. vol. 44, No. 3, pp. 419–431. Mar., 1972.

*CRC Critical Reviews in Microbiology*. vol. 10, Issue 2, pp. 174, 180, 187, 191–193.

* cited by examiner

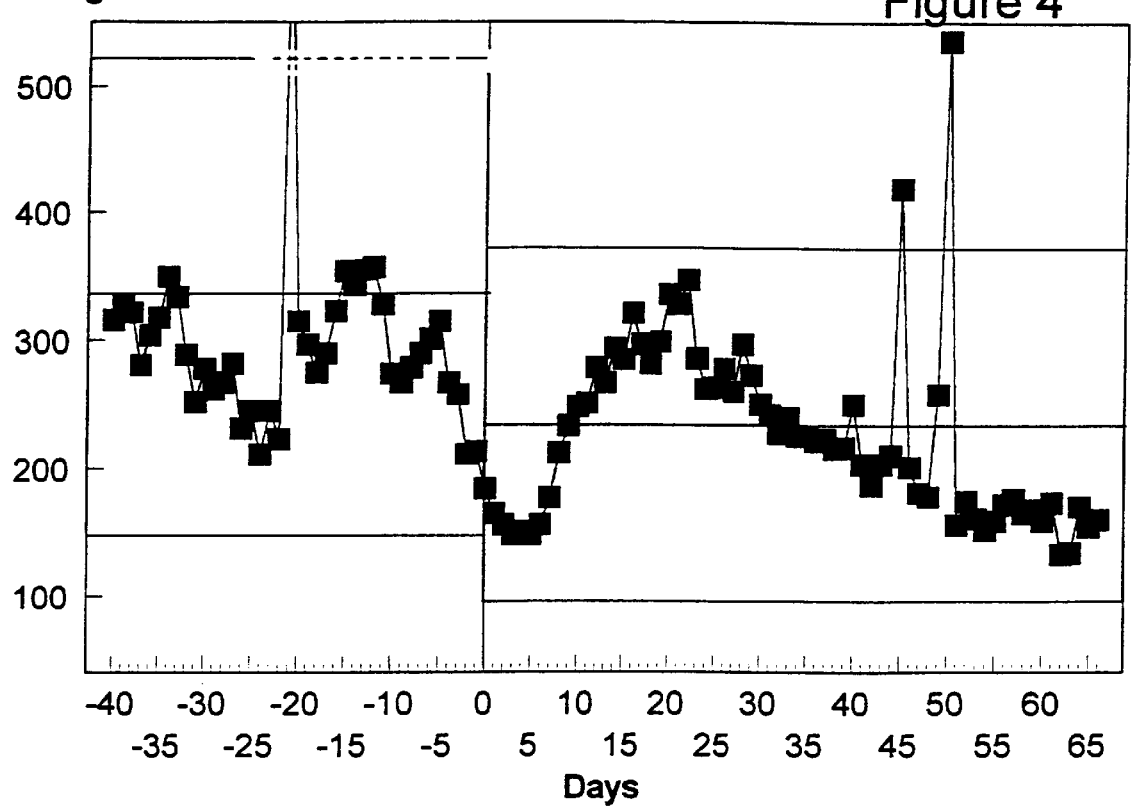

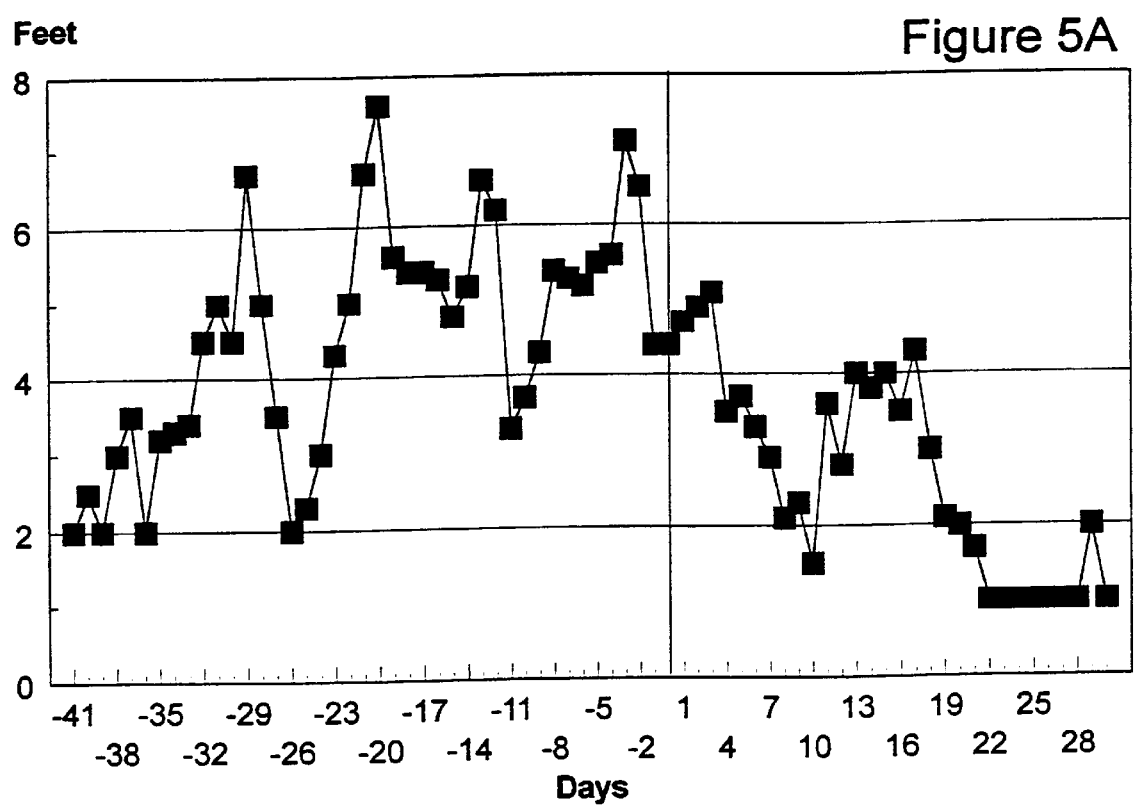

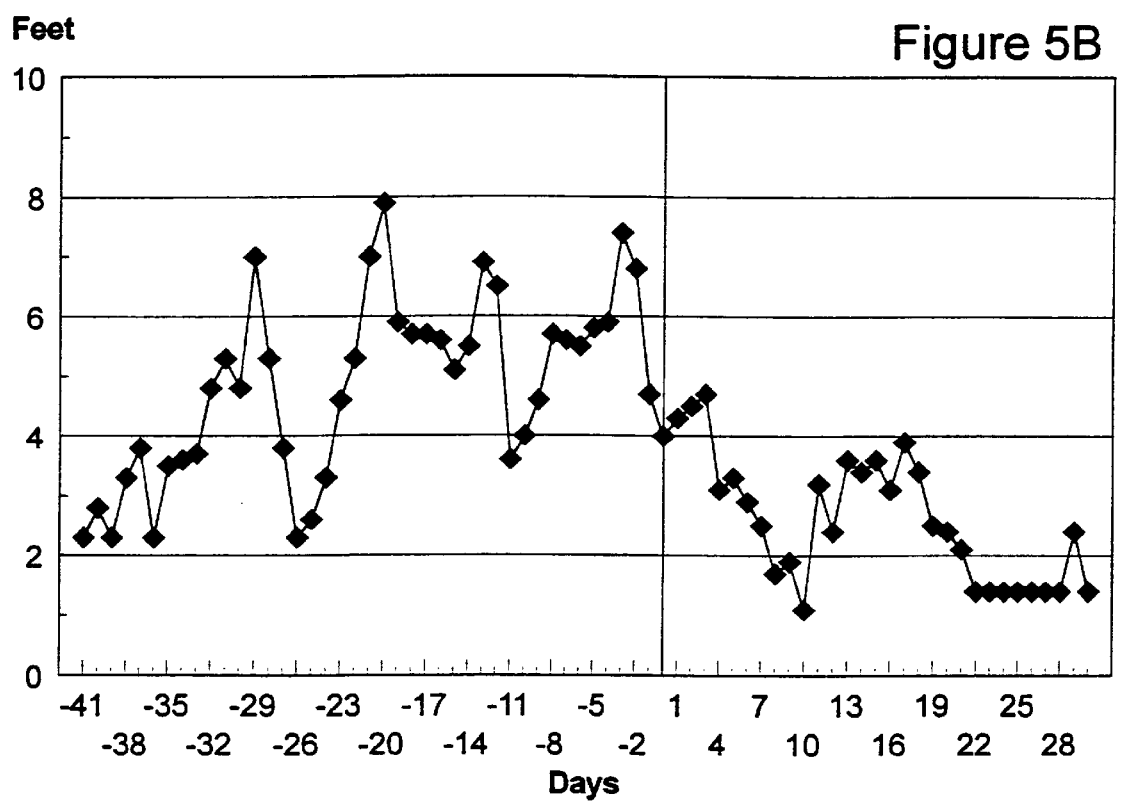

COMPOSITION AND METHOD FOR REMOVING SUSPENDED SOLIDS FROM WASTEWATER

This application is a continuation of U.S. application Ser. No. 08/971,348. filed Nov. 17, 1997, now U.S. Pat. No. 6,039,875.

BACKGROUND OF THE INVENTION

1. Field of Invention

The invention relates generally to wastewater treatment and more particularly to the establishment of flocculated bacteria to wastewater treatment systems.

2. Prior Art

Bacteria are utilized in wastewater treatment to break down and remove pollutants from the water before it is discharged. One of the ways the pollutant levels are measured is by testing five day biological oxygen demand ($BOD_5$) of the effluent. Another test criteria is total suspended solids (TSS) present in the effluent. This criteria is typically referred to as the mixed liquor suspended solids (MLSS) when it is measured in the biological treatment lagoon or aeration tank. The organic fraction of the suspended solids are referred to as mixed liquor volatile suspended solids (MLVSS), and is generally about 60–85% of the MLSS. To satisfy local and federal regulations which both vary from plant to plant, effluent must be within certain $BOD_5$ and TSS limits among other criteria. Failure to satisfy these regulations can have various adverse consequences, including fines for the plant and criminal penalties for the plant management. Exceeding discharge levels can also have adverse environmental effects on the waterways into which the effluent is discharged.

Bacteria in wastewater treatment plants can be loosely grouped into three principal categories for purposes of the present invention: dispersed bacteria; flocculated bacteria; and filamentous bacteria. As the name implies, dispersed bacteria are isolated bacteria that are free in the wastewater. The other two categories describe bacteria that exist in large groups or 'flocs' containing many bacteria. The higher surface area of the flocculated bacteria allows them to compete more effectively for the organic matter that contribute to the $BOD_5$ of the wastewater. As the flocs capture more and more organic matter, their density increases, and in typical flocs, they eventually fall out of solution, forming a sludge and leaving a supernatant that is low in both TSS and $BOD_5$.

Filamentous bacteria form flocs that are quite different from those of the flocculated bacteria. The filamentous floc is comprised of numerous long filaments that extend between the bacteria. These filaments can be several times as long as the bacteria and there can be several filaments produced by each bacteria. The end result is a filamentous floc that is high in surface area and low in density. The low density prevents the filamentous bacteria from settling out of the wastewater. When the effluent is discharged, the filamentous flocs add to the suspended solids count and can cause the effluent to exceed its TSS permit level.

One way that the 'settleability' of the sludge is measured is by the sludge volume index or SVI, measured in milliliters per gram. An SVI value of below 100 ml/g is a good indication that the sludge will settle and compact well. Conversely, an SVI value above 200 ml/g indicates that the sludge will settle slowly and that a coagulant will probably be needed. High SVI levels are one indication that there may be a filamentous infestation in the wastewater. A good explanation of SVI is provided in *The Nalco Water Handbook*, 23.1–23.22 (Frank N. Kemmer ed., McGraw-Hill 1988)(2nd ed.) which is hereby incorporated by reference to the extent it is not contrary to the teachings herein.

The degree of filamentous bacteria infestation is rated on the Eickelbloom, Jenkins and Richards scale which ranges from 0 to 6, with 6 being the highest level of infestation and 0 being completely free of filamentous bacteria. Filamentous infestations that rate in excess of 4 will usually interfere with settling.

Certain conditions favor the establishment of filamentous bacteria in the wastewater stream. This typically arises when dissolved oxygen content is low (less than about 0.1 to 0.5 mg/l), when the levels of nutrients such as $NH_3$ and $PO_4$ are low (less than about 1 mg/l each), when sulfide content is high, and when food to microorganism ratios (F/M ratios) are either very high (above about 0.5 lb. $BOD_5$ per lb. MLSS) or very low (below about 0.2 lb. $BOD_5$ per lb. MLSS). These causative conditions should be corrected if possible.

Once filamentous bacteria become established, it can be very difficult for the more desirable flocculated bacteria to displace them. The high surface area of the filamentous bacteria makes them very effective in terms of their ability to compete with the other bacteria for organic matter, oxygen, and nutrients suspended in the wastewater.

One solution is to add chlorine to the system, often in the form of NaClO. Most common sources of chlorine (e.g., $Cl_2$, NaClO, and $ClO_2$) form hypochlorous acid (HClO) when they dissociate in water. Hypochlorous acid is a recognized disinfectant which works by disrupting transfers across the bacteria cell walls. The chlorine indiscriminately kills the bacteria that it contacts. This can create a problem because it is undesirable to eliminate all of the bacteria. Some bacteria must remain to continue treating the wastewater. Elimination of all of the bacteria will likely result in the effluent exceeding discharge limits for $BOD_5$ and other criteria.

The goal in chlorination is usually to eliminate only the filamentous bacteria so that the flocculated bacteria can reestablish predominance. This is done by providing the chlorine in low doses. The idea is that the high surface area of the filamentous bacteria, which helps it out compete the other bacterial forms for organic matter, oxygen, and other nutrients will also cause it to absorb more of the chlorine. Thus, a larger percentage of the filamentous bacteria will be killed by the chlorine relative to the other bacteria. The remaining flocculated bacteria, having a larger surviving population will, in theory at least, be able to predominate as the bacterial population reestablishes itself.

Several problems commonly arise in chlorination treatment. One of the most common is over-chlorination. The difference between the quantities needed to eliminate the filamentous population and the quantities that will wipe out substantially all of the bacteria can be relatively small. Providing too much chlorine can reduce the bacterial population so severely that there are not enough microorganisms left to treat the wastewater as discussed above.

Another problem is that killing the filamentous bacteria may not keep them from returning. The conditions which fostered the growth of the filamentous bacteria in the first place cannot always be easily corrected. If favorable conditions for the filamentous bacteria continue to exist in the treatment stream, new filamentous bacteria will continue to appear, and may predominate as the post-chlorination bacterial population is reestablished.

Another problem that can arise is chlorine resistant bacteria. The practice of attempting to kill the filamentous bacteria with the smallest amount of chlorine possible will invariably lead to the survival of some of the bacteria. These bacteria will pass on their chlorine resistant traits to their offspring, creating a population of filamentous bacteria that is chlorine resistant. If the filamentous problem persists in the treatment plant, it can become increasingly difficult to effectively control them with limited quantities of chlorine. As the required dosages increase, so does the likelihood that the flocculated bacteria will be killed along with filamentous bacteria.

After the filamentous bacteria have been inhibited, it is still necessary to get the fragments of the filamentous flocs and the other suspended solids to settle out to avoid violating TSS discharge limits. Many suspended particles are colloids which can make settling difficult.

A colloid is a particle of one substance that is surrounded by particles of a second substance such that the particles of the first substance are prevented from combining. Suspended particles that have a diameter of less than about 10 $\mu$m are generally considered colloidal. Most bacteria have a diameter of about 1 $\mu$m and thus are considered colloidal. Gravity is always operating to pull the colloidal particles down and out of suspension. Opposing the force of gravity are the van der Waals forces which keep the particles in suspension and separated from one another. The principle van der Waals force in an aqueous solution is the interaction between the dipole of water molecules and the negative charge that is present on most colloidal and other suspended particles. To get the particles to fall out of suspension, the first step is to eliminate the charge on the particles.

One type of coagulant used to remove colloidal particles from solution are metal salts such as alum, lime, ferric chloride, and ferrous sulfate. The salts release metal ions upon dissolution, which then form hydroxides at varying rates depending upon the pH of the system. For example, alum, $Al_2(SO_4)_3$, forms a water insoluble aluminum hydroxide, $Al(OH)_3$, when added to water. The wastewater stream is usually agitated to bring the hydroxide particles into contact with the colloids and with each other. The hydroxides will physically enmesh the colloids as they encounter them, creating a floc. The positive charge on the metal ion will neutralize the negative charge on the colloid. With the charge neutralized, the flocs can agglomerate until they reach a size that can easily fall out of solution.

There are several disadvantages to using metal salts for solid removal. First, the binding of water to the metal ions creates a gelatinous sludge with a high water content. Dewatering costs for metal ion sludges are typically higher than for other sludges. Second, the formation of metal hydroxides is pH dependent. If the pH of the system falls after the metal salts have been added, the hydroxides may not form and settling will not be enhanced. A third disadvantage to using metal coagulants is that a number of metals will form complexes or ligands with phosphate. Phosphate is essential to much bacterial activity. The formation of the metal-phosphate complexes may cause the phosphates to fall out of solution or otherwise become unavailable to bacteria. This can upset the biological function of the system.

Synthetic organic polymers are common coagulants and flocculents that are used in place of metal salts. These polymers are usually ionic, although some are nonionic. The ionic polymers capture the colloids through ion-ion interactions. The charge on the colloids is neutralized by the opposite charge of the polymer. The nonionic polymers capture colloids through polymer geometry, dipole ion interactions and van der Waals forces. The polymers neutralize the charge on the colloids, which overcomes the van der Waals force between the colloid and the water dipole. The polymers can also join several colloidal particles together through inter-particle bridging. Strands of polymer connected particles then become physically entwined in one another to form flocs. As other suspended particles come into contact with the floc, they become physically enmeshed. The flocs will grow by continued enmeshment of suspended particles and by agglomeration with other flocs until they become dense enough to settle out.

While polymers generally work well in the removal of many suspended solids, there are several disadvantages to the use of synthetic polymers. First, synthetic polymer treatment is expensive, due in large part to the quantities that are required. Plants often must add as much as several hundred pounds of polymer per million gallons of flow treated per day.

Second, many of the polymers are toxic to aquatic species. When a polymer adheres to a biological floc and eventually settles out, it has not "disappeared." Instead it has adhered to the sludge, which will eventually have to be disposed. Changing conditions such as pH or temperature or other environmental factors can cause dissolution of the polymer and the release of its toxic constituents. Thus, sludges containing toxic polymers may need to be treated before they can be placed in a landfill or other appropriate disposal facility.

A third disadvantage that synthetic polymers face is their inflexibility. Many wastewater treatment plants have an influent that is not constant. Variance in the influent can change the properties required of the polymer. Thus, a polymer that can successfully coagulate the suspended solids present in the wastewater on Monday may not work on Wednesday.

A fourth disadvantage of synthetic polymers is their lack of effect on $BOD_5$. If chlorination has been used to combat filamentous bacteria causing TSS problems, effluent $BOD_5$ levels may become a problem. The prior art coagulants typically have no effect in this regard.

Accordingly a coagulant and flocculent and a method of using the same meeting the following objectives is desired

OBJECTS OF THE INVENTION

It is an object of the invention to remove suspended solids from wastewater.

It is another object of the invention to remove suspended solids from wastewater with a minimum amount of coagulant or flocculent.

It is another object of the invention to minimize the amount of sludge formed when removing suspended solids from wastewater.

It is another object of the invention to rapidly establish a population of flocculated bacteria in wastewater treatment systems.

It is another object of the invention to minimize the need for chlorine in the elimination of filamentous bacteria infestations in wastewater treatment systems.

It is another object of the invention to minimize the toxicity of the sludge formed when removing suspended solids from wastewater.

It is another object of the invention to provide a coagulant capable of adapting to changing suspended solids.

It is another object of the invention to provide a coagulant capable of treating $BOD_5$.

It is another object of the invention to remove suspended solids from wastewater while maintaining a low effluent $BOD_5$ level.

It is another object of the invention to remove suspended solids form wastewater efficiently and economically.

SUMMARY OF THE INVENTION

The invention comprises the use of bacterially generated exo-polymers to foster the formation of settleable flocs in wastewater treatment facilities. Exo-polymer producing bacteria such as *Bacillus polymyxa* are added to wastewater treatment systems. These bacteria reproduce a many times, quickly increasing the number of exo-polymer producing bacteria over the number initially introduced. The exo-polymers these bacteria produce serve as coagulants by capturing the colloidal and other larger suspended particles and neutralizing their charge. Charge neutralization eliminates the primary van der Waals forces operating to keep the particles apart. Agitation of the wastewater will cause the exo-polymers and their captured particles to contact each other and agglomerate into flocs. The exo-polymers also act as flocculents by connecting flocs to other particles and to other flocs through inter-particle bridging. Reducing the agitation or flow of the system to a laminar or non-turbulent rate will allow the floc to increase in size until it is dense enough to settle out of solution. The bacteria in the floc, including the exo-polymer producing bacteria, will continue to treat the $BOD_5$ sources in the wastewater as long as they are present. By seeding wastewater treatment facilities with exo-polymer producing bacteria after chlorination, the formation of a flocculated bacteria population can be accelerated. Also, the exo-polymer producing bacteria can be used to displace filamentous bacteria with flocculated bacteria without chlorination.

BRIEF DESCRIPTION OF THE DRAWINGS

FIG. 4 illustrates the change in SVI levels as measured in the influent to the secondary clarifiers of the wastewater treatment plant discussed in example 2.

FIG. 5A illustrates the sludge blanket depth in secondary clarifier 12A of FIG. 3.

FIG. 5B illustrates the sludge blanket depth in secondary clarifier 12B of FIG. 3.

DETAILED DESCRIPTION OF THE PREFERRED EMBODIMENT OF THE INVENTION

Figure 1:
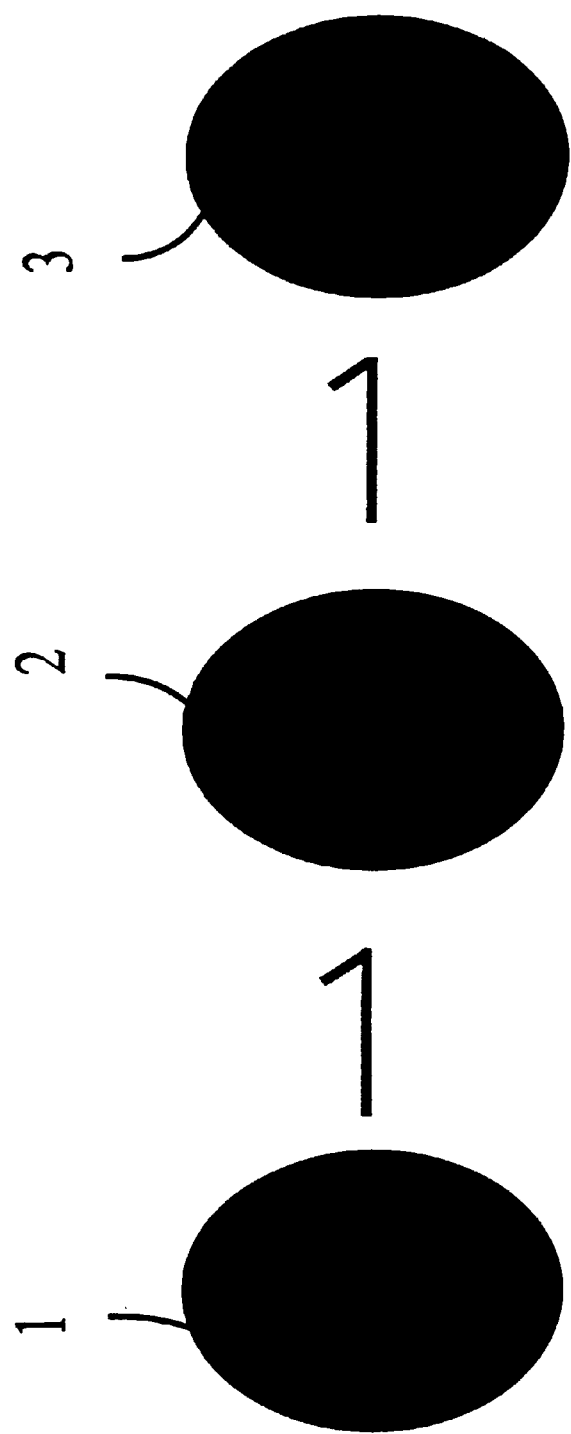
FIG. 1 is a schematic view of a generic wastewater treatment plant.

The invention relates to the use of bacteria to generate exo-polymers. These exo-polymers act as coagulants and flocculents in substantially the same manner as their synthetic counterparts. The exo-polymers capture the suspended particles and neutralize their charge which eliminates the strongest of the van der Waals forces keeping the particles suspended. With the charge neutralized, the bacteria and their captured particles can come into contact with one another as the wastewater is agitated. As they do, the exo-polymers become physically entwined with one another and agglomerate into a floc.

As the exo-polymer floc grows, other particles will become enmeshed in the floc. This enmeshment will generally be a physical entrapment like a fly in a spider's web rather than a chemical process. As the particles are enmeshed, they fill in the spaces in the floc, increasing its density. Eventually, the flocs begin to collide with one another rather than simply with other particles. They will combine to create larger flocs.

All of the foregoing processes can take place in turbulent flow, that is water having a Reynolds number in excess of about 600. To complete the process, a polishing step should be performed. This involves gradually reducing the flow to a non-turbulent or laminar rate, i.e. a Reynolds number of less than about 600. At this reduced flow rate, the flocs will continue to grow, increasing from a microscopic size to a macroscopic size. The flocs will also continue to capture individual particles. If the flow rate is not reduced, the turbulence will cause the flocs to shear apart before they are large enough to settle efficiently.

As the flocs continue to increase in density, they will eventually fall out of suspension. The point at which they settle is governed by Stokes Law which holds that the higher the density of a suspended body, the higher the velocity at which it will settle out of suspension. Thus, lowering the flow rate has two effects. First, it allows the flocs to continue to grow which promotes settling. Second, it reduces the velocity of the flocs which also promotes settling.

The presence of exo-polymer producing bacteria is essential to the formation of settleable flocs in wastewater treatment. Bacteria of many different genera are known to produce exopolymers. These include:

Caulobacter, Zooglea, Pseudomonas, Sphaerotilus, Achromobacter, Flavobacterium, Bacillus, Micrococcus, Aeromonas, Klebsiella, Azotobacter, Angrobacterium, Alcaligenes, Streptococcus, Beggiatoa, Enterobacter, Escherichia, and Acetobacter as well as Candida which is a yeast.

By seeding wastewater with exo-polymer producing bacteria after chlorination, it has been found that the establishment of flocculated bacteria populations can be accelerated. This gives the flocculated bacteria a significant competitive advantage over the filamentous bacteria, and can allow the flocculated bacteria to predominate. Seeding the wastewater with these exo-polymer producing bacteria can also help the bacteria populations to rebound quickly from chlorination, helping to prevent potential $BOD_5$ problems. Additionally, it has been found that the introduction of exo-polymer producing bacteria can allow the flocculated bacteria to displace the filamentous bacteria without the use of chlorine.

A strain of bacteria that has been found to be an especially prolific producer of exo-polymers is Bacillus polymyxa, strain number B-21881, which is on deposit at the Agricultural Research Service Collection, and is hereafter referred to as *Bacillus polymyxa*, NRRL B-21881. This bacteria produces a polysaccharide on the order of 0.4 to 0.6 grams of exo-polymer per gram of organism. Stated differently, the bacteria can generate exo-polymer in quantities that are as high as 40 to 60 percent of its own weight. This can be compared to more typical rates of about 0.15 to 0.20 grams of polymer per gram of organism found in other exo-polymer producers such as *Klebsiella pneumonia*. The exo-polymer produced by the *Bacillus polymyxa*, NRRL B-21881 also has been found to have a molecular weight that is quite high. Tests indicate the molecular weight of the exo-polymer to be at least 100,000 which can be compared to the more typical values of 40,000 to 60,000 found in other exo-polymer producers such as some Klebsiella species.

This is significant to the ability of the exo-polymer to serve as a flocculent. The higher molecular weight implies a longer molecule that is capable of interacting with colloidal particles at a greater number of locations than its smaller counterparts. Additionally, the exo-polymer of the *Bacillus polymyxa* are believed to cross-link extensively with each other, creating a large web of exo-polymers capable of enmeshing a greater number of suspended particles.

The mechanics by which biologically produced exo-polymers form flocs and remove solids from suspension is similar to that of their synthetic counterparts. However, the exo-polymer producing bacteria offer several advantages. First, the bacteria will reproduce while the chemical polymers obviously will not. Under favorable conditions, the bacteria reproduce at a rate of about 36 generations per day. Thus, if there were one *Bacillus polymyxa* at 8:00 am (bacteria reproduce asexually), by 8:00 am the next day, there would be about $2.8 \times 10^{14}$ bacteria present, less the number that may have died. The result is that approximately 15 pounds of *Bacillus polymyxa* culture containing about $5 \times 10^9$ culture forming units (cfu) per gram is usually sufficient to remove the suspended solids from one million gallons of effective system volume (defined below). This can be contrasted with the several hundred pounds of synthetic polymers required per million gallons per day (mgd) as discussed above.

A second advantage that the bacteria produced exo-polymers offer over their synthetic counterparts is their non-toxicity. The exo-polymers created by the bacteria are non-toxic and thus do not create a toxic sludge. Accordingly, bacterial exo-polymers in a sludge do not require treatment before the sludge can be disposed.

A third advantage that the exo-polymer producing bacteria offer is their ability to treat $BOD_5$. These bacteria are biological agents that will eliminate the BOD $_5$sources in the water. This advantage is particularly important when chlorination of the filamentous bacteria has killed substantially all of the system's bacteria. Synthetic polymers, being chemical agents only, do not treat $BOD_5$.

A fourth advantage that the exo-polymer producing bacteria provide is their ability to displace filamentous bacteria. This is believed to be a result of at least three separate characteristics, one or more of which may be present in acceptable exo-polymer producing bacteria. First, the exo-polymer producers stimulate the production of numerous flocculated bacteria flocs. Because of their numbers, these flocs can compete effectively with the filamentous floes for the organic matter and nutrients in the wastewater. Second, the preferred exo-polymer producing bacteria, *Bacillus polymyxa*, NRRL B-21881, has been found to take up phosphate in quantities that exceed the amounts used in biological activity. It has also been observed to contain Poly-β-Hyrdoxybutyrate (PHB) storage polymers. PHB's are internal molecules that some bacteria use to store nutrients. *The Bacillus polymyxa*, NRRL-B-21881 is believed to incorporate the phosphate into the PHB polymers when phosphate is plentiful for later use when it may be scarce. Most bacteria lack the ability to store phosphate so that when it is not present in the environment, biological activity is not able to take place. The ability to incorporate phosphate in PHB storage polymers gives *Bacillus polymyxa*, NRRL B-21881, and other polymer producers that share this trait, an especially effective advantage over many filamentous bacteria. Third, the *Bacillus polymyxa*, NRRL B-21881, is believed to produce an antibiotic which may be toxic to the filamentous bacteria. Some strains of *Bacillus polymyxa* are known to produce the antibiotic Polymyxin B. This antibiotic is believed to inhibit the filamentous bacteria.

Another advantage provided by the bacterial polymers is their flexibility. The exo-polymer producing bacteria are believed to be able to modify the exo-polymers they produce to some degree in response to their environment. The survival of the bacteria in conditions where the organic matter content is low is directly related to their ability to successfully create flocs. As discussed above, the floccing process is a function of the bacteria's ability to generate exo-polymers that will create interparticle bridges with the colloids in the water. Exo-polymers with different characteristics are necessary to effectively bond with different colloidal particles. It is not clear whether the individual bacteria can actually generate different exo-polymers as the environment varies or if there are different strains or sub-strains of bacteria, each of which generates a different type of exo-polymer, some of which are able to predominate due to that strain's ability to more effectively create flocs. Regardless of the biological means, bacteria populations are able to tailor their exo-polymers to the colloids in the media, an ability synthetic polymers do not share. Because of this trait, when bacteria are to be cultivated prior to their addition to the wastewater stream, such as when they are added to a non-aerated system as discussed below, it is preferable to conduct the cultivation in a media drawn at least in part from the environment in which they are intended to be used.

Although it is anticipated that other uses of the invention will occur to those skilled in the art, the invention is expected to be particularly useful in industrial and municipal wastewater treatment facilities. The relevant components of a generic wastewater treatment facility are illustrated in FIG. 1. The wastewater commonly flows from a primary clarifier 1 into an aeration basin 2 and from there into a secondary clarifier 3. The effluent is usually discharged after leaving secondary clarifier 3. A flocculent may be needed in both clarifiers. The preferred methods of application vary somewhat depending upon the site at which the bacteria are introduced.

A problem typically arising is the presence of filamentous flocs in the effluent. As discussed above, the system may be disinfected of filamentous bacteria, typically by adding chlorine. When the filamentous clumps have been killed and broken up, the goal is to cause the fragments and other suspended solids to settle out while keeping $BOD_5$ levels in check.

This is accomplished by adding cultures of exo-polymer producing bacteria, such as *Bacillus polymyxa*, NRRL B-21881, to the system. Preferably at least about $1.0\times10^{13}$ cfu's of bacteria per million gallons and more preferrably at least about $3.4\times10^{13}$ cfu's per million gallons should be provided to the system. The appropriate system parameter is generally the larger of the volume which flows through the system in one day (millions of gallons per day×1 day= millions of gallons), or the volume of the basin or lagoon where the bacteria are to be added (measured in millions of gallons). The larger volume is considered the effective system volume for dosing purposes. Because of possible variations in the effluent which may change the characteristics of the wastewater, including its possible toxicity to the bacteria, the cultures are preferably added over about three to five days. In treatment systems where the conditions giving rise to the proliferation of filamentous bacteria cannot be easily remedied, it may be necessary to continue adding exo-polymer producing bacteria in order to keep the filamentous bacteria in check. In such maintenance situations, exo-polymer producing bacteria should preferably be added in quantities of at least about $5.0\times10^{11}$ cfu's per million gallons of effective system volume. Optimal quantities may vary with the individual characteristics of particular wastewater and should be determined by experimentation.

It has been found that the exo-polymer production of *Bacillus polymyxa*, NRRL B-21881 can be optimized by introducing the microorganism with other bacteria that remove $BOD_5$. The additional bacteria are believed to consume the $BOD_5$ more quickly than the exo-polymer producers. This minimizes the time needed to reduce soluble $BOD_5$ levels to the point where the production of exo-polymers is stimulated. Once the low $BOD_5$ levels (below about 50 mg/l) have been obtained, the competitive advantage of the exo-polymer producing bacteria allows them to predominate. The additional bacteria which have been found to be most beneficial when used in concert with the exo-polymer producing bacteria include *Bacillus subtilis* (ATCC strains 49760, 27370), *Bacillus cereus* (ATCC strains 12826, 438821) *Bacillus licheniformis* (ATCC strain 27811), *Bacillus thuringiensis* (ATCC strain 35866), *Pseudomonas aeruginosa* (ATCC strains 25319, 25324, 43088, 17468, 19712), and *Pseudomonas fluorescens* (ATCC strain 27559). Quantities of each will vary with each individual wastewater stream.

Bacterial nutrients may need to be added to the wastewater with the bacteria to promote the growth of the bacteria. Bacterial protoplasm has the empirical formula $C_{60}H_{87}O_{23}N_{12}O$. To build this protoplasm, the bacteria must have access to the elemental components in their environment. As a general rule, bacteria require approximately 2 to 5 parts nitrogen and 1 part phosphorous for every 100 parts of $BOD_5$ in the wastewater. Bacteria also require certain trace nutrients such as iron, manganese, magnesium, copper, folic acid, and vitamins $B_6$ and $B_{12}$. These trace nutrients should preferably be present in the wastewater in quantities of about 0.005 to 0.1 ppm each. Additional nutrients are needed for the bacteria to produce exo-polymers. Tryptone is necessary to the production of some exo-polymers; however, this is present in bran which is typically used as a growth media during culture fermentation. Amino acids are also needed for the production of the exo-polymers. These are typically already present in the wastewater, making their addition unnecessary.

Some additives that may be introduced to the cultures or directly to the wastewater to satisfy the nutritional and biological needs of the bacteria include glacial rock, disodium phosphate, coral sand, Triton X-100 (TX-100), available from Van, Waters & Rogers, 777 Brisbane, Houston, Tex. 77061, and diatomaceous earth (Diafil 110), available from D&F Distribution, 10201 Northwest Freeway, Suite 212, Houston Tex. 77092. Glacial rock provides mineral micronutrients such as iron, manganese, magnesium, and copper to the bacteria. About 0.01 to 0.02 pounds of glacial rock per pound of bacteria is generally sufficient. Disodium phosphate provides phosphate to the wastewater which is necessary for many bacteriological activities. About 0.20 pounds of disodium phosphate per pound of bacteria culture is generally sufficient. Coral sand provides a high surface area for initial colony formation. About 0.16 to 0.20 pounds of coral sand per pound of bacteria culture is generally sufficient. The diatomaceous earth is a preservative used to prevent insect contamination of the bran during storage. The TX-100 is a wetting agent used to promote thorough mixing of the bacteria during culture preparation. Both the diatomaceous earth and the TX-100 should preferably be provided in ratios of about 0.002 to 0.005 pounds per pound of bacteria culture. When cultures exceed the desired concentration, they can be reduced by the addition of wheat shorts.

Cultures are prepared through two standard methods which are both well known to those skilled in the art and will, therefore, only be briefly described. The first is deep-tank fermentation. In this method, pure samples of a specific strain of bacteria are grown in fermentation kettles. These are essentially water baths in which the proper temperature, pH, $BOD_5$, dissolved oxygen, and nutrient conditions are provided for bacterial growth and reproduction. After the requisite amount of bacteria have been produced, the cells are centrifuged into a paste. The paste is then treated with a cryoprotectant such as milk solids and added to a carrier such as bran. The cultures are then freeze dried until needed.

The other method is tray fermentation. In this method, the bacteria are taken from the kettle as in deep-tank fermentation; however, they are not frozen so no cryoprotectant is needed. Instead, the paste is added directly to a bran carrier and incubated. The paste contains the bacteria as well as the nutrients and other bacterial necessities that was present in the kettles. The bacteria and their carriers are incubated at controlled temperature and humidity levels to achieve a high yield in a minimum amount of time. After fermentation is complete, the intermediate cultures comprised of individual bacterial strains are stored until needed. Eventually, the intermediate cultures are mixed together to obtain the desired culture composition for a particular application.

The inventors' preferred culture formulations are given below. Composition A is most preferably used in starting systems exhibiting severely upset conditions such as a severe filamentous or dispersed bacteria infestation. Composition B is most preferably used in maintaining wastewater treatment systems whose filamentous or dispersed bacteria problems have already been brought under control. Finally, Composition C is most preferably used in systems that are deficient in phosphate. It is suited for use in start-up and maintenance.

| Composition A | | |
|---|---|---|
| Bacteria | ATCC Code | Organisms per gram |
| Bacillus subtilis | 49760 | $2.45 \times 10^9$ |
| Bacillus cereus | 12826 | $4.94 \times 10^8$ |
| Bacillus cereus | 43881 | $4.94 \times 10^8$ |
| Bacillus licheniformis | 27811 | $4.94 \times 10^8$ |
| Bacillus thuringiensis | 35866 | $4.94 \times 10^8$ |
| Pseudomonas aeruginosa | 25319 | $2.42 \times 10^9$ |
| Pseudomonas aeruginosa | 25324 | $8.42 \times 10^8$ |
| Pseudomonas aeruginosa | 43088 | $1.88 \times 10^8$ |
| Pseudomonas aeruginosa | 17468 | $5.55 \times 10^8$ |
| Pseudomonas aeruginosa | 19712 | $1.82 \times 10^9$ |
| Bacillus polymyxa | NRRL B-21881 (No ATCC Code) | $3.00 \times 10^9$ |
| TOTAL | | $1.50 \times 10^{10}$ |
| Additional Materials | | |
| Coral Sand | | 0.20 lb per lb culture |
| TX-100 | | 0.0025 lb per lb culture |
| Diatomaceous Earth (Diafil 110) | | 0.005 lb per lb culture |

The culture should have a minimum PCA of $1.0 \times 10^{10}$ cfu/g after a minimum of 24 hours incubation at 35° C. 'PCA' stands for Pseudomonas count augar which is a quality control measure for the bacterial culture.

| Composition B | | |
|---|---|---|
| Bacteria | ATCC Code | Organisms per gram |
| *Bacillus subtilis* | 49760 | $6.40 \times 10^8$ |
| *Bacillus subtilis* | 27370 | $3.20 \times 10^8$ |
| *Bacillus cereus* | 12826 | $2.13 \times 10^8$ |
| *Bacillus cereus* | 43881 | $3.20 \times 10^8$ |
| *Bacillus licheniformis* | 27811 | $2.13 \times 10^8$ |
| *Bacillus thuringiensis* | 35866 | $2.13 \times 10^8$ |
| *Pseudomonas aeruginosa* | 25319 | $6.40 \times 10^8$ |
| *Pseudomonas aeruginosa* | 17468 | $3.20 \times 10^8$ |
| *Pseudomonas aeruginosa* | 19712 | $3.20 \times 10^8$ |
| *Pseudomonas fluorescens* | 27559 | $8.00 \times 10^8$ |
| *Bacillus polymyxa* | NRRL B-21881 (No ATCC Code) | $1.50 \times 10^9$ |
| TOTAL | | $5.50 \times 10^9$ |
| Additional Materials | | |
| Coral Sand | | 0.20 lb per lb culture |
| TX-100 | | 0.0025 lb per lb culture |
| Diatomaceous Earth (Diafil 110) | | 0.005 lb per lb culture |

The culture should have a minimum PCA of $3.0 \times 10^9$ cfu/g after a minimum of 24 hours incubation at 35° C.

| Composition C | | |
|---|---|---|
| Bacteria | ATCC Code | Organisms per gram |
| *Bacillus subtilis* | 49760 | $1.96 \times 10^9$ |
| *Bacillus cereus* | 12826 | $3.95 \times 10^8$ |
| *Bacillus cereus* | 43881 | $4.44 \times 10^8$ |
| *Bacillus licheniformis* | 27811 | $3.95 \times 10^8$ |
| *Bacillus thuringiensis* | 35866 | $3.95 \times 10^8$ |
| *Pseudomonas aeruginosa* | 25319 | $1.94 \times 10^9$ |
| *Pseudomonas aeruginosa* | 25324 | $6.74 \times 10^8$ |
| *Pseudomonas aeruginosa* | 43088 | $1.50 \times 10^9$ |
| *Pseudomonas aeruginosa* | 17468 | $4.44 \times 10^8$ |
| *Pseudomonas aeruginosa* | 19712 | $1.46 \times 10^9$ |
| *Bacillus polymyxa* | NRRL B-21881 (No ATCC Code) | $1.50 \times 10^9$ |
| TOTAL | | $1.20 \times 10^{10}$ |
| Additional Materials | | |
| Disodium phosphate | | 0.20 lb per lb culture |
| Coral Sand | | 0.16 lb per lb culture |
| TX-100 | | 0.002 lb per lb culture |
| Diatomaceous Earth (Diafil 110) | | 0.005 lb per lb culture |

The culture should have a minimum PCA of $8.0 \times 10^9$ cfu/g after a minimum of 24 hours incubation at 35° C.

One preferred location for the introduction of bacteria is aeration basin 2 or the wastewater stream immediately prior to aeration basin 2. There they will reproduce and consume $BOD_5$ sources. As the soluble $BOD_5$ is reduced to less than about 50 mg/l, the bacteria will begin to produce exo-polymers, and the formation of flocs and enmeshment of suspended solids will begin as described above. The flow rate in aeration tank 2 should preferably be kept turbulent so that the flocs will not settle there.

The floes will be carried into secondary clarifier 3 by the effluent from aeration lagoon 2. In secondary clarifier 3, the flow rate should be non-turbulent or laminar. There the floes will agglomerate. Because the density at which the particles fall out of solution is velocity dependant, the flow rate should preferably remain substantially constant during agglomeration. This will cause the floes to settle out of solution at substantially the same density and will create a sludge comprised of particles having a generally uniform size. The result is a sludge which is easier to pump.

Throughout the entire process, the bacteria in the floes will continue to reduce $BOD_5$ while simultaneously lowering TSS.

If a flocculent is needed in primary clarifier 1, there are two problems that must be considered when using bacterially produced polymers. First, there is usually an abundance of organic matter in primary clarifier 1. The ready access to organic matter will prevent the bacteria from producing exo-polymers. Second, most exo-polymer producing bacteria are aerobes or facultative anaerobes; however, primary clarifier 1 is often not aerated. The bacteria need oxygen levels of at least about 0.3 mg per liter to produce exo-polymers and should preferably have between about 1.0 and 1.4 mg per liter, although higher amounts do not appear to have adverse effects. As the oxygen dissolved in the wastewater is consumed, exo-polymer production will cease. As the oxygen is eliminated, the aerobic bacteria will die as will the facultative bacteria if there are no secondary electron acceptors such a nitrates or sulfates present. Accordingly, few if any exo-polymers will be produced under the conditions typically present in primary clarifier 1.

To overcome these problems, the exo-polymers may be cultivated before the bacteria is introduced to primary clarifier 1. This would be done by placing the bacteria in an aerated environment preferably drawn at least in part from the body into which the bacteria are to be introduced. The bacteria would then reduce the $BOD_5$ levels to a point where exo-polymer production would occur. When the desired amount of exo-polymers have been produced, the bacteria can be added to primary clarifier 1. It would not matter that the bacteria might die in unaerated primary clarifier 1. The exo-polymers perform their charge neutralization and interparticle bridging functions by virtue of the chemistry of the exo-polymer, not as a function of the cellular activity of the bacteria. In fact, it would be possible to achieve the same results by separating the exo-polymers from the bacteria and introducing only the exo-polymers to the system. Of course, if the bacteria were not present or if they were to die, the advantage of having them as an additional $BOD_5$ filter would be lost, as would the advantage of having the bacteria generate additional exo-polymers in the system. However, the advantage of having a non-toxic exo-polymer would remain.

When the process is complete, the suspended solids will have been captured in the flocs and settled into the sludge at the bottom of the system. While most of the suspended solids are removed by settling, a minority may float out of suspension. This will usually result in a layer of foam being present on the surface. Discharge of the foam may be avoided by skimming and by drawing effluent from the center of the unit. The result is a clear effluent within specification for TSS and $BOD_5$ and, assuming the rest of the treatment process has been conducted properly, within specification for other contaminants as well.

Best results are anticipated when the product is used in media having a pH of between 6.0 and 8.5 and temperatures between 50° and 104° F. (10° and 40° C.). Extremes in pH and temperature as well as rapid changes in either should preferably be avoided. Cultures should preferably be soaked in water and influent before introduction to the system. The bath should preferably be comprised of 50% water and 50% influent and should have a pH approximately equal to that of the system. The cultures should be allowed to soak, with occasional stirring, for one to two hours. One gallon of bath is sufficient for one pound of culture. Introduction into the system should preferably be made as close as biologically practical to the influent point.

Prior to treatment, the susceptibility of particular wastewater facilities to the above described treatment can be evaluated by bench tests. One preferred by the inventors comprises the preparation of a test flask and a control flask. The test flask (1000 ml) should be filled with 250 ml of influent to the portion of the system that is to receive the bacteria. Where the bacteria are to be added to the aeration basin of an activated sludge system, a second 250 ml should be drawn from the aeration basin. Where the bacteria are to be added to a lagoon, the second 250 ml should be drawn from the lagoon, preferably from a point in the lagoon that is less than 50% influent strength. If the wastewater is deficient in nutrients, $PO_4$ and $NH_3$ levels should be adjusted to comprise at least 5 ppm of the solution. Finally, 50 ml of bacterial inoculum should be added. The inoculum is prepared by adding 5 grams of the bacterial culture to 100 ml of sterile deionized water and stirring for 45 minutes. After settling, the supernatant can be used for the inoculant. The control flask is prepared in the same way, except that the 50 ml of water are added instead of inoculum. If more than one culture is being considered, a test flask should be prepared for each culture.

The flasks should be mixed and aerated for 48 to 72 hours. At the end of the first 24 hours, the flasks should settle for 2 hours. After settling, 125 ml of supernatant should be removed for analysis. The removed fluid should be replaced with 125 ml of influent. Stirring should be resumed and the procedure repeated every twenty-four hours unless the first test provides conclusive results.

The extracted fluid should be evaluated for microscopic floc quality and filamentous presence, visible turbidity, SVI, SV30 (the SVI after 30 minutes of settling), and TSS. Best results generally can be expected by 48 hours after the test commences. Passage of the test will depend upon the goals of the individual plant.

Particular examples and the results obtained in practicing a preferred embodiment of the invention are given below. There are, of course, alternate embodiments and applications, which should be obvious to those skilled in the art in view of the foregoing description and in view of the following examples, that are intended to be included within the scope of the claims which follow.

EXAMPLE 1

Figure 2:
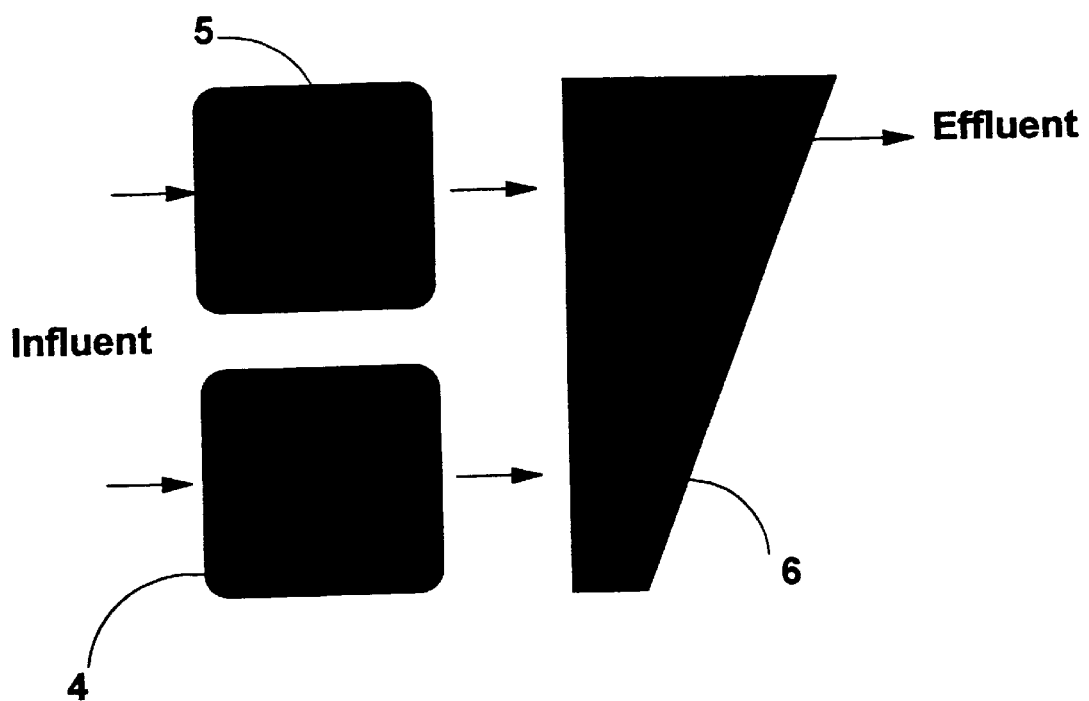
FIG. 2 is a schematic view of the wastewater treatment plant discussed in example 1.

The method was tested in a paper mill exhibiting long term suspended solids problems with its effluent. The system, a flow diagram of which is provided in FIG. 2, had three separate aeration lagoons 4, 5, and 6. Lagoons 4 and 5 each held approximately 80,000 m³ and were approximately 16 ft. deep. Lagoon 6 held approximately 320,000 m³ and was also approximately 16 ft. deep. Lagoons 4 and 5 were aerated with 1,500 fine bubble diffusers each driven by four 450 horsepower blowers. Aeration was provided to lagoon 6 with sixteen surface aerators. Retaining time in lagoons 4 and 5 averaged thirty-six to forty-eight hours. These two lagoons, operating in parallel, each discharged into lagoon 6. Retention time there was three to five days, resulting in an overall retention time for the system of five to seven days. Effluent for the system was approximately 20 mgd.

the system was historically effective in treating $BOD_5$. Table 1 gives the historical rages for $BOD_5$ influent and effluent over the two years preceding the test.

TABLE 1

| Year | Influent (mg/l) | Effluent (mg/l) | Removal % |
|---|---|---|---|
| 1 | 310 | 89 | 71 |
| 2 | 360 | 87 | 76 |

The $BOD_5$ trends continued over the three months of year 3 prior to the trial. Table 2 annual average $BOD_5$ levels for the system during year 3 prior to the trial.

TABLE 2

| Month | Influent (mg/l) | Effluent (mg/l) | Removal % |
|---|---|---|---|
| 1 | 308 | 67 | 79 |
| 2 | 324 | 89 | 73 |
| 3 | 318 | 68 | 79 |
| 4 day 1–15 | 298 | 78 | 74 |

The system had been experiencing recurring filamentous problems (filamentous infestation ratings in excess of 4) in the spring. These recurring filamentous infestations gave rise to excessive effluent TSS (over about 120 mg/l). The TSS levels in year 3 prior to the test are given in Table 3.

TABLE 3

| Month | Influent (mg/l) | Effluent (mg/l) | % Increase |
|---|---|---|---|
| 1 | 118 | 108 | [8.5] |
| 2 | 111 | 123 | 10.8 |
| 3 | 97 | 118 | 21.6 |
| 4 day 1–15 | 191 | 147 | [25.1] |

As can be seen from the foregoing results, the plant was experiencing unacceptably high TSS levels (about 120 mg/l or higher), although $BOD_5$ levels were satisfactory. The increase in TSS levels during treatment indicates, inconclusively, infestation by filamentous bacteria.

In the middle of month four, the system was tested to determine its suitability for treatment with exo-polymer producing bacteria. This test confirmed the presence of Thiothrix type I and type II filamentous bacteria and indicated a filamentous infestation rating in excess of 5. In addition, bench testing previously described indicated that the plant would be susceptible to treatment by the described method.

The system was chlorinated from day 15 through day 17, by adding increasing doses of sodium hypochlorite, NaClO, to lagoons 4 and 5. A sufficient amount of NaClO was added on day 15 to establish a hypochlorite concentration in the lagoons of 35 mg/l. Microscopic evaluation of samples taken from lagoon 6 indicated that the filamentous bacteria had been inhibited hypochlorite treatment, but that the filamentous clumps were not adequately fragmented. Sufficient additional NaClO was provided on day 17 to raise the hypochlorite concentration to 75 mg/l in lagoons 4 and 5. In total, 31,000 kilograms of 15.5 percent NaClO were added to lagoon 4 and another 31,000 kilograms were added to lagoon 5. Further microscopic evaluation revealed thorough fragmentation of the filamentous clumps. The filamentous bacteria remained in check for the remainder of the test, rating less than 3 through at least the end of month 6.

Introduction of exo-polymer generating bacteria was begun on day 17. Bacteria culture composition B, described above, was used. Two-hundred and fifty pound doses were added to lagoon 4 and to lagoon 5 on days 17 and 18. Another 150 pound dose was added to each lagoon on day 19 and again on day 20. Dosage was reduced to 75 pounds per lagoon on day 21 through day 22. Dosage was reduced further to 25 pounds per lagoon on day 23 through day 30. Treatment was stopped on day 30 through day 37 to determine the effect the treatment was having on the pond. Treatment recommended on day 38. 150 pounds of composition B were added to both lagoon 4 and lagoon 5 on day 38, 39, and 40. Treatment continued through day 183. After day 40, treatment comprised the addition of 15 pounds of composition B per day to lagoon 6.

The treatment was quite successful in reducing effluent TSS. Effluent TSS (mg/l) during the test is given below in Table 4. The effluent TSS for the corresponding months during the previous year are provided for comparison.[2]

TABLE 4

| Month | Year 2 | Year 3 | Improvement |
|---|---|---|---|
| 4 days 16–30 | 138 | 88 | 36 |
| 5 | 138 | 128 | 7 |
| 6 | 125 | 85 | 32 |
| 7 | 123 | 103 | 20 |
| 8 | 121 | 104 | 14 |
| 9 | 110 | 72 | 35 |

Not illustrated in Table 4 is the immediate drop in TSS upon the initiation of treatment. TSS went from 147 mg/l during the first two weeks of month 4 to an average of 85 mg/l during the last two weeks. This constitutes a 38 percent improvement in TSS effluent levels. Significantly, this was not accompanied by an increase in effluent $BOD_5$. To the contrary, average effluent $BOD_5$ actually decreased during treatment. Table 5 illustrates the average $BOD_5$ levels for the system during year 3 during the trial.

TABLE 5

| Month | Influent (mg/l) | Effluent (mg/l) | Removal % |
|---|---|---|---|
| 4 day 1–15 | 321 | 69 | 79 |
| 4 day 16–30 | 294 | 50 | 78 |
| 5 | 330 | 67 | 77 |
| 6 | 310 | 52 | 83 |
| 7 | 284 | 53 | 81 |
| 8 | 305 | 53 | 83 |
| 9 | 260 | 37 | 84 |

EXAMPLE 2

Figure 3:
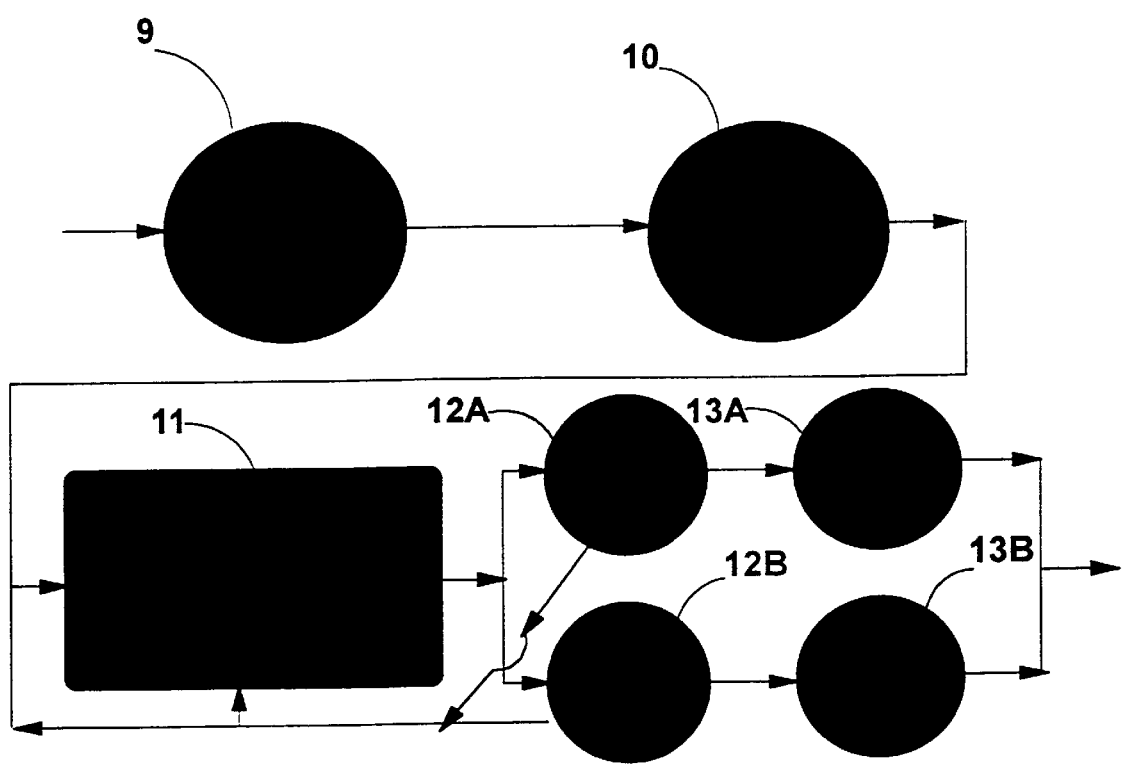
FIG. 3 is a schematic view of the wastewater treatment plant discussed in example 2.

The method was tested in a bleached kraft pulp and paper mill in the northeast United States. The plant's wastewater treatment system, the principal components of which are illustrated in the flow chart contained in FIG. 3, comprises a head tank 9, a primary clarifier 10, an activated sludge aeration basin 11, two secondary clarifiers 12A and 12B, and two tertiary clarifiers 13A and 13B. Head tank 9 held approximately 60,000 $m^3$ and was approximately 30 ft. deep. Primary clarifier 10 held approximately 28,400 $m^3$ and was approximately 14 ft. deep. Aeration basin 11 held about 70,000 $m^3$ and was approximately 8 ft. deep. Aeration was provided in aeration basin 11 by thirty-one 75 horsepower surface aerators. Finally, secondary clarifiers 12A and 12B as well as tertiary clarifiers 13A and 13B each held approximately 13,500 $m^3$ and were about 10 ft. deep. The plant averaged between 15 to 20 million gallons of wastewater loading per day and discharged approximately the same volume in effluent. Daily $BOD_5$ loadings averaged between 30,000 and 50,000 pounds. The plant is generally successful in the treatment of $BOD_5$ and in the removal of TSS from its effluent. However, it had a long term history of excessive synthetic polymer use to achieve its TSS goals. It also had a filamentous bacteria infestation that was believed to be contributing to the suspended solids settling difficulties. The plant would not allow chlorination of the filamentous bacteria. The method was employed to determine if it could 1) reduce the need for synthetic polymers to control TSS effluent levels and 2) displace the filamentous bacteria without chlorination, and 3) increase settleability as measured by SVI.

Prior to the initiation of the test, the wastewater as drawn from the effluent from aeration basin 11 was evaluated for filamentous bacteria. Four types of filamentous bacteria were found to be present. They were Thiothrx I, Type 0041, Type 021N, and Type 0675. The filamentous infestation rating was between 5 and 6, indicating a moderate to severe infestation.

Additional pretest measurements included SVI, synthetic polymer usage, and sludge blanket depth, which is a measure of the volume of the lagoon occupied by the sludge. The SVI, as measured in the effluent from aeration basin 11, had a mean value of 289 mg/l. The sludge blankets in secondary clarifiers 12 A and 12B had a mean depth of 4.5 ft. and 4.8 ft. respectively. The plant was using a mean rate of 6.95 pounds per minute of a 4000 molecular weight synthetic polyamine. This synthetic polymer was added to the effluent from aeration basin 11. All of the foregoing measurements refer to the forty days prior to initiation of treatment.

The system was treated with bacterial cultures as described above in Compositions B and C. The cultures were added to the system at aeration basin 11. The culture additions are detailed in Table 6.

TABLE 6

| Day | Composition | Quantity (lbs) |
|---|---|---|
| 0 | B | 200 |
| 1 | B | 200 |
| 2 | B | 150 |
| 3 | B | 150 |
| 4 | B | 100 |
| 5 | B | 100 |
| 6 | B | 150 |
| 7 | B | 100 |
| 8 | B | 100 |
| 9 | B | 200 |
| 10 | B | 150 |
| 11–17 | — | 0 |
| 18 | C | 200 |
| 19 | C | 100 |
| 20 | C | 100 |
| 21+ | C | 25 |

The treatment had a dramatic effect upon the system, as described below.

Figure 6:
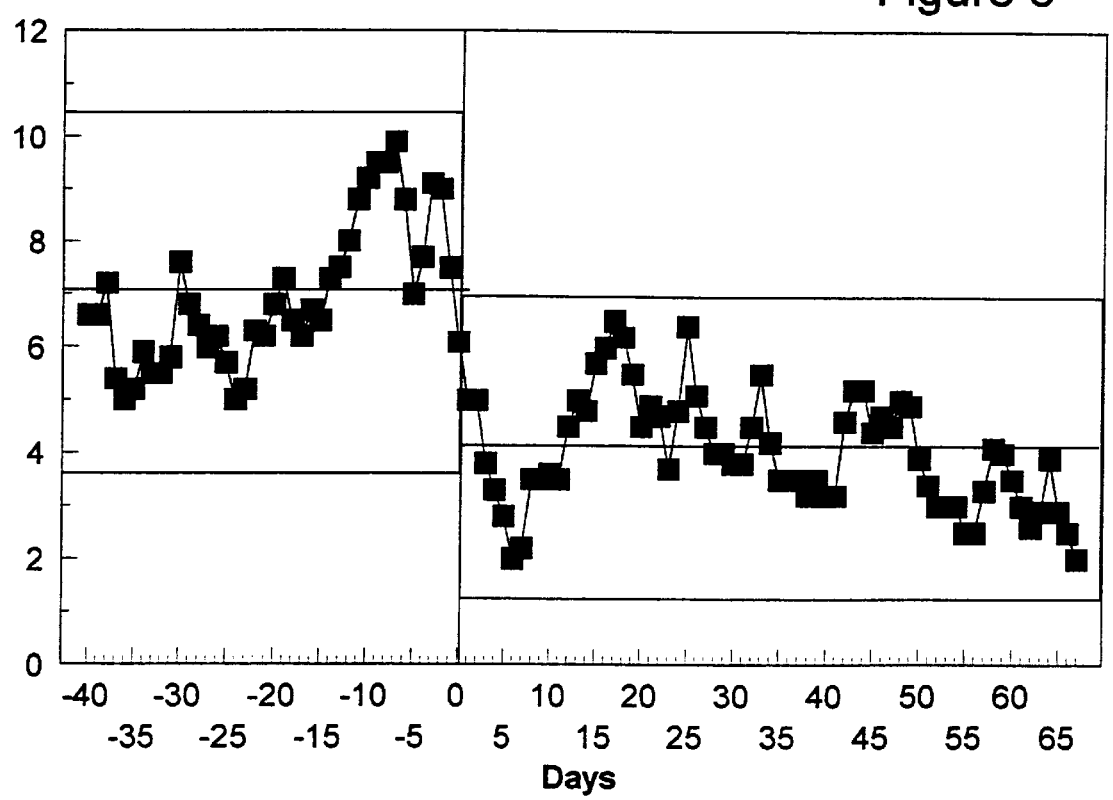
FIG. 6 illustrates the daily polymer usage at the wastewater treatment facility discussed in example 2.

The filamentous bacteria infestation rating was reduced from between 5 and 6 to less than 3. This represents a substantial drop in filamentous populations, made more significant by the fact that it was done without the use of chlorine or other synthetic disinfectant. The mean SVI was reduced from 289 to 227, representing a 22% decrease. The SVI values as measured in the effluent from aeration basin 11 are illustrated in FIG. 4. The sludge blanket in secondary clarifier 12A was reduced from a mean depth of 4.5 ft. to a mean depth of 2.7 ft. Similarly, the sludge blanket in secondary clarifier 12B was reduced from a mean depth of 4.8 ft. to a mean depth of 2.6 ft. The sludge blanket depth measurements of secondary clarifiers 12A and 12B are illustrated in figures SA and SB. Finally, the synthetic polymer additions were reduced 42 percent from seven pounds per minute to four pounds per minute. This represents a daily saving to the plant of over $2,000.00. FIG. 6 illustrates the polymer usage at the plant before and during the test.

Influent $BOD_5$ levels throughout the test were consistent with the levels ordinarily experienced by the plant. In the six months prior to the test, it had averaged approximately 34,694 pounds per day. In the previous two calendar years, $BOD_5$ had averaged approximately 38,577 and 31,249 pounds per day, respectively. Thus, the test period average of approximately 30,700 pounds per day was well within the ordinary plant loading.

What is claimed is:

1. A method of treating a filamentous bacteria infestation in an aqueous solution comprising:

establishing turbulent conditions in said aqueous solution;

adding to said solution cultures of exo-polymer producing bacteria capable of producing at least about 0.4 grams of exo-polymer for each gram of exo-polymer producing bacteria wherein said exo-polymers are capable of capturing suspended particles in said turbulent conditions;

establishing sufficient levels of dissolved oxygen in said solution to support the production of said exo-polymers by said bacteria; and establishing sufficiently low $BOD_5$ levels in said solution to stimulate the production of said exo-polymers by said bacteria.

2. A method of treating a filamentous bacteria infestation in an aqueous solution comprising:

establishing turbulent conditions in said aqueous solution;

adding cultures of bacteria capable of producing exo-polymers having a molecular weight of at least about 100,000 to said solution wherein said exo-polymers are capable of capturing suspended particles in said turbulent conditions;

establishing sufficient levels of dissolved oxygen in said solution to support the production of said exo-polymers by said bacteria; and establishing sufficiently low $BOD_5$ levels in said solution to stimulate the production of said exo-polymers by said bacteria.

* * * * *